United States Patent
Rasmussen et al.

(10) Patent No.: US 7,773,774 B2
(45) Date of Patent: Aug. 10, 2010

(54) DYNAMIC TEST PATTERN COMPOSITION FOR IMAGE-ANALYSIS BASED AUTOMATIC MACHINE DIAGNOSTICS

(75) Inventors: D. Rene Rasmussen, Pittsford, NY (US); Meera Sampath, Penfield, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1808 days.

(21) Appl. No.: 10/878,265

(22) Filed: Jun. 28, 2004

(65) Prior Publication Data

US 2005/0286742 A1    Dec. 29, 2005

(51) Int. Cl.
*G06K 9/00* (2006.01)
*H04N 1/40* (2006.01)

(52) U.S. Cl. ............... 382/112; 382/275; 368/3.23

(58) Field of Classification Search .......... 382/100, 382/112, 113, 140, 135–139, 155, 169, 195, 382/209, 232, 255, 274, 276, 305, 318, 319; 358/406, 1.13, 3.23; 399/26, 9
See application file for complete search history.

(56) References Cited

U.S. PATENT DOCUMENTS

| | | | |
|---|---|---|---|
| 5,642,202 A * | 6/1997 | Williams et al. ............ 358/406 |
| 5,864,730 A * | 1/1999 | Budnik et al. ............... 399/26 |
| 5,893,008 A * | 4/1999 | Budnik et al. ............... 399/26 |
| 5,903,796 A | 5/1999 | Budnik et al. |
| 5,937,224 A | 8/1999 | Budnik et al. |
| 5,946,521 A | 8/1999 | Budnik et al. |
| 5,960,228 A | 9/1999 | Budnik et al. |
| 5,995,775 A | 11/1999 | Budnik et al. |
| 6,016,204 A | 1/2000 | Budnik et al. |
| 6,081,348 A | 6/2000 | Budnik et al. |
| 6,198,885 B1 | 3/2001 | Budnik et al. |
| 6,275,600 B1 | 8/2001 | Banker et al. |
| 6,388,758 B2 * | 5/2002 | Kawanabe et al. ......... 358/1.13 |
| 6,441,923 B1 * | 8/2002 | Balasubramanian et al. .......... 358/3.23 |
| 6,522,430 B1 | 2/2003 | Dalal et al. |
| 6,529,616 B1 | 3/2003 | Rasmussen et al. |
| 6,571,000 B1 * | 5/2003 | Rasmussen et al. ......... 382/112 |
| 6,597,473 B1 | 7/2003 | Rasmussen et al. |
| 6,606,395 B1 | 8/2003 | Rasmussen et al. |
| 6,608,932 B1 * | 8/2003 | Rasmussen et al. ......... 382/195 |
| 6,665,425 B1 * | 12/2003 | Sampath et al. ............ 382/112 |
| 2003/0142985 A1 * | 7/2003 | Sampath et al. ............ 399/9 |

OTHER PUBLICATIONS

Pending U.S. Appl. No. 09/450,185, filed Nov. 29, 1999.
Pending U.S. Appl. No. 09/487,582, filed Jan. 19, 2000.

* cited by examiner

*Primary Examiner*—Seyed Azarian
(74) *Attorney, Agent, or Firm*—Duane C. Basch; Basch & Nickerson LLP

(57) ABSTRACT

The present invention is directed to a system and method for test target selection in conjunction with dynamic test pattern generation. In the invention, a test pattern page(s) is composed using an optimal set of test targets, which can be accommodated or adjusted to fit within size constraints of the test pattern. The method of the present invention makes use of layout optimization to ensure that related and optimized test targets are accommodated on a single test pattern. For example, it may be preferable to "squeeze in" a smaller-than-normal uniform area target, rather than not to print it at all during a test.

18 Claims, 14 Drawing Sheets
(3 of 14 Drawing Sheet(s) Filed in Color)

| Failure Mode | Defect Presence | Defect Orientation | Defect Polarity | Defect Spread | Defect Separation |
|---|---|---|---|---|---|
| Normal | None | None | None | None | None |
| P/R Scratch | All Pages | Short Edge | Light | Isolated | Not-fuser-distance |
| Poor P/R Ground | CVT/Platen Page | Long Edge | Light | Isolated | Not-fuser-distance |
| Bad Charge Corotron | All Pages | Short Edge | Dark | Uniform | Not-fuser-distance |
| Damaged Cleaner Blade | All Pages | Short Edge | Light | Isolated | Not-fuser-distance |
| Damaged Fuser Finger | All Pages | Short Edge | Light | Isolated | Fuser-distance |
| Damaged Donor Roll | All Pages | Short Edge | Dark | Isolated | Not-fuser-distance |
| Contaminated Exposure | All Pages | Short Edge | Light | Isolated | Not-fuser-distance |
| Contam. CVT Glass | All Pages | Short Edge | Dark | Isolated | Not-fuser-distance |

FIG. 9

| FEATURE | PROBABILITIES | | | | |
|---|---|---|---|---|---|
| // | Normal | Contam_cvt_glass | Failed_charge_corotron | Poor_P/R_ground | |
| // | N | F1 | F2 | F3 | F2F3 |
| "start_diagnoser" | 0.05 | 0.35 | 0.3 | 0.2 | 0.1 |
| "uniformity_test,pass" | 0.7 | 0.7 | 0.7 | 0.7 | 0.7 |
| "uniformity_test,fail" | 0.3 | 0.3 | 0.3 | 0.3 | 0.3 |
| "charge_test,pass" | 0.7 | 0.7 | 0.3 | 0.7 | 0.3 |
| "charge_test,fail" | 0.3 | 0.3 | 0.7 | 0.3 | 0.7 |
| "cleaner_test,pass" | 0.7 | 0.7 | 0.7 | 0.7 | 0.7 |
| "cleaner_test,fail" | 0.3 | 0.3 | 0.3 | 0.3 | 0.3 |
| "ros_test,pass" | 0.7 | 0.7 | 0.7 | 0.7 | 0.7 |
| "ros_test,fail" | 0.3 | 0.3 | 0.3 | 0.3 | 0.3 |
| "ground_test,pass" | 0.7 | 0.7 | 0.7 | 0.3 | 0.3 |
| "ground_test,fail" | 0.3 | 0.3 | 0.3 | 0.7 | 0.7 |
| "streak_present,yes" | 0.02 | 0.02 | 0.98 | 0.02 | 0.98 |
| "streak_present,no" | 0.98 | 0.98 | 0.02 | 0.98 | 0.02 |
| "streak_type_isolated_dark,yes" | 0 | 0.98 | 0.3 | 0 | 0.3 |
| "streak_type_isolated_dark,no" | 0 | 0.02 | 0.7 | 0 | 0.7 |
| "streak_type_isolated_light,yes" | 0 | 0.05 | 0.05 | 0 | 0.05 |
| "streak_type_isolated_light,no" | 0 | 0.95 | 0.95 | 0 | 0.95 |
| "streak_type_multiple_dark,yes" | 0 | 0.05 | 0.9 | 0 | 0.9 |
| "streak_type_multiple_dark,no" | 0 | 0.95 | 0.1 | 0 | 0.1 |
| "streak_type_multiple_light,yes" | 0 | 0.05 | 0.4 | 0 | 0.45 |
| "streak_type_multiple_light,no" | 0 | 0.95 | 0.6 | 0 | 0.55 |
| "streak_fuser_distance,yes" | 0 | 0.02 | 0.02 | 0 | 0.02 |
| "streak_fuser_distance,no" | 0 | 0.98 | 0.98 | 0 | 0.98 |
| "band_present,yes" | 0.02 | 0.02 | 0.02 | 0.5 | 0.5 |
| "band_present,no" | 0.98 | 0.98 | 0.98 | 0.5 | 0.5 |
| "band_type_dark,yes" | 0 | 0 | 0. | 0.3 | 0.3 |
| "band_type_dark,no" | 0 | 0 | 0 | 0.7 | 0.7 |

| | | | | | |
|---|---|---|---|---|---|
| "band_type_light,yes" | 0 | 0 | 0 | 0.9 | 0.9 |
| "band_type_light,no" | 0 | 0 | 0 | 0.1 | 0.1 |
| "band_donor_roll_distance,yes" | 0 | 0 | 0 | 0.02 | 0.02 |
| "band_donor_roll_distance,no" | 0 | 0 | 0 | 0.98 | 0.98 |
| "band_mag_roll_distance,yes" | 0 | 0 | 0 | 0.02 | 0.02 |
| "band_mag_roll_distance,no" | 0 | 0 | 0 | 0.98 | 0.98 |
| "streak_on_evt,yes" | 0.02 | 0.98 | 0.98 | 0.98 | 0.98 |
| "streak_on_evt,no" | 0.98 | 0.02 | 0.02 | 0.02 | 0.02 |
| "streak_on_print,yes" | 0.02 | 0.02 | 0.98 | 0.98 | 0.98 |
| "streak_on_print,no" | 0.98 | 0.98 | 0.02 | 0.02 | 0.02 |
| "streak_on_white,yes" | 0.02 | 0.98 | 0.02 | 0.02 | 0.02 |
| "streak_on_white,no" | 0.98 | 0.02 | 0.98 | 0.98 | 0.98 |
| "streak_present_alternate_sheets,yes" | 0.02 | 0.02 | 0.02 | 0.02 | 0.02 |
| "streak_present_alternate_sheets,no" | 0.98 | 0.98 | 0.98 | 0.98 | 0.98 |
| "band_present_alternate_sheets,yes" | 0.02 | 0.02 | 0.02 | 0.7 | 0.7 |
| "band_present_alternate_sheets,no" | 0.98 | 0.98 | 0.98 | 0.3 | 0.3 |

FROM FIG. 10

FIG. 11

| Failure | Test |
|---|---|
| Contaminated CVT Glass | Streak_and_Band_Test, Streak_on_CVT_Test |
| Failed Charge Corotron | Streak_and_Band_Test, Machine_Test |
| Poor P/R Ground | Streak_and_Band_Test, Machine_Test, Streak_and_Band_2Sheet_Test |
| Scratched P/R I | Streak_and_Band_Test, Machine_Test, Streak_and_Band_2Sheet_Test |
| Scratched P/R II | Streak_and_Band_Test, Machine_Test |
| Damaged Cleaner Blade | Streak_and_Band_Test, Machine_Test, Streak_on_White_Test |
| Donor Roll Run Out | Streak_and_Band_Test |
| Failed P/R Belt Charge Corotron | Streak_and_Band_Test, Streak_and_Band_2Sheet_Test |
| Damaged Fuser Finger | Streak_and_Band_Test |
| Mag Roll Run Out | Streak_and_Band_Test |
| Object Rubbing Donor Roll | Streak_and_Band_Test |
| Contaminated Donor Roll | Streak_and_Band_Test |
| Scanner Failure | Streak_and_Band_Test, Streak_on_Print_Test |
| Contaminated ROS Exposure | Streak_and_Band_Test, Machine_Test |

| Failure Mode | Uniformity Test | Cleaner Test | Charge Test | ROS Test | Ground Test |
|---|---|---|---|---|---|
| Normal | Pass | Pass | Pass | Pass | Pass |
| P/R Scratch | Fail | Pass | Pass | Pass | Pass |
| Poor P/R Ground | Pass | Pass | Pass | Pass | Fail |
| Bad Charge Corotron | Pass | Pass | Fail | Pass | Pass |
| Damaged Cleaner Blade | Pass | Fail | Pass | Pass | Pass |
| Damaged Fuser Finger | Pass | Pass | Pass | Pass | Pass |
| Damaged Donor Roll | Pass | Pass | Pass | Pass | Pass |
| Contaminated Exposure | Pass | Pass | Pass | Fail | Pass |
| Contam. CVT Glass | Pass | Pass | Pass | Pass | Pass |

| FEATURE | PROBABILITIES | | | | |
|---|---|---|---|---|---|
| // | Normal | Contam_cvt_glass | Failed_charge_corotron | Poor_P/R_ground | |
| // | N | F1 | F2 | F3 | F2F3 |
| "uniformity_test,pass" | 0.7 | 0.7 | 0.7 | 0.7 | 0.7 |
| "uniformity_test,fail" | 0.3 | 0.3 | 0.3 | 0.3 | 0.3 |
| "charge_test,pass" | 0.7 | 0.7 | 0.3 | 0.7 | 0.3 |
| "charge_test,fail" | 0.3 | 0.3 | 0.7 | 0.3 | 0.7 |
| "cleaner_test,pass" | 0.7 | 0.7 | 0.7 | 0.7 | 0.7 |
| "cleaner_test,fail" | 0.3 | 0.3 | 0.3 | 0.3 | 0.3 |
| "ros_test,pass" | 0.7 | 0.7 | 0.7 | 0.7 | 0.7 |
| "ros_test,fail" | 0.3 | 0.3 | 0.3 | 0.3 | 0.3 |
| "ground_test,pass" | 0.7 | 0.7 | 0.7 | 0.3 | 0.3 |
| "ground_test,fail" | 0.3 | 0.3 | 0.3 | 0.7 | 0.7 |

FIG. 14

| Failure | Test |
|---|---|
| Contaminated CVT Glass | "Clean CVT Platen Glass" |
| Failed Charge Corotron | "Replace Xerographic Unit" |
| Poor P/R Ground | "Replace Xerographic Unit" |
| Scratched P/R I | "Replace Xerographic Unit" |
| Scratched P/R II | "Replace Xerographic Unit" |
| Damaged Cleaner Blade | "Replace Xerographic Unit" |
| Donor Roll Run Out | "Place Service Call" |
| Failed P/R Belt Charge Corotron | "Replace Xerographic Unit" |
| Damaged Fuser Finger | "Replace Fuser Unit" |
| Mag Roll Run Out | "Place Service Call" |
| Object Rubbing Donor Roll | "Place Service Call" |
| Contaminated Donor Roll | "Place Service Call" |
| Scanner Failure | "Place Service Call" |
| Contaminated ROS Exposure | "Replace Xerographic Unit" |

FIG. 15

Machine Test: Cleaner Stress Test, Banding Test
Cleaner Stress Test Outputs: Cleaner Test Part1, Cleaner Test Part2
Banding Test Outputs: Banding Test Part1 Variation, Banding Test Part2 Variation Features to be Extracted: Cleaner Test Pass, Cleaner Test Fail
Algorithm used for Feature Extraction: Quadratic Classifier of the form $D_i^2(x) = (x-m_i)^1 S_i^{-1}(x-m_i) + Ln|S_i|$ Where x = [Abs(Cleaner Test Part1 − Cleaner Test Part2)

Abs(sqrt(Banding Test Part1 Variation) − sqrt(Banding Test Part2 Variation))
sqrt(Banding Test Part2 Variation)]

m1, m2, S1, S2 are precomputed parameters
m1 = Mean value of vector x for all data samples corresponding to a broken cleaner blade
m2 = Mean value of vector x for all data samples corresponding to a normally functioning cleaner blade
S1 = Covariance matrix computed for all data samples corresponding to a broken cleaner blade
S2 = Covariance matrix computed for all data samples corresponding to a normal cleaner blade
|S_i| = Determinant of the covariance matrix $S_i$
D1 = Squared distance of x to Group 1 which corresponds Broken Cleaner Blade
D2 = Squared distance of x to Group 2 which corresponds Normal Cleaner Blade For a given x, if D1 < D2, Feature = Cleaner Test Fail; Else Feature = Cleaner Test Pass

*FIG. 16*

DYNAMIC TEST PATTERN COMPOSITION FOR IMAGE-ANALYSIS BASED AUTOMATIC MACHINE DIAGNOSTICS

CROSS-REFERENCE

The following U.S. patent is cross-referenced and is hereby incorporated by reference in its entirety for its teachings: "SYSTEMS AND METHODS FOR AUTOMATED IMAGE QUALITY BASED DIAGNOSTICS AND REMEDIATION OF DOCUMENT PROCESSING SYSTEMS" to Sampath et al., U.S. Pat. No. 6,665,425, issued Dec. 16, 2003.

FIELD OF THE INVENTION

This invention relates to malfunction diagnosis of defects in document processing systems, and more particularly to the dynamic generation of test pattern(s) based on defect feature analysis and machine data analysis.

BACKGROUND AND SUMMARY OF THE INVENTION

In document processing systems, it is well known that customer satisfaction can be improved and maintenance costs reduced if problems with copiers and printers can be detected and resolved before they become serious enough to warrant a service call from the customer. Systems exist that enable printers and copiers to call for service automatically, when sensors detect certain operating parameters outside of permissible ranges. Generally, these systems take effect after a threshold has been reached where the degradation in image quality is likely observable by the user. Given the large number of operating parameters that need to be tracked during operation, a specific defect at a certain level may or may not be a significant problem. The overall effect of a specific defect depends on the cumulative values of the other parameters in the system. Systems do exist that attempt to diagnose failures in document processing systems based on image quality analysis of the print.

An example of such a system is in U.S. Pat. No. 6,665,425 to Sampath et al., issued Dec. 16, 2003. Other examples of test pattern and measurement technology include:

U.S. Pat. No. 6,529,616, for a "TECHNIQUE FOR ACCURATE COLOR-COLOR REGISTRATION MEASUREMENTS," by Rasmussen, et al., issued Mar. 4, 2003, discloses a test pattern and measurement technique used to allow highly accurate measurements of color-color registration in an image output device that prints in cyan, magenta, yellow, and black. The technique automatically factors out errors originating from skew between the detector and the subject of measurement.

U.S. Pat. No. 6,522,430 directed to "QUANTIFICATION OF MOTION QUALITY EFFECT ON IMAGE QUALITY," by Dalal et al., issued Feb. 18, 2003, teaches a special test pattern and measurement technique used to allow highly accurate measurements of motion quality defects in an image output device that prints in monochrome or color;

U.S. Pat. No. 6,275,600, to Banker et al., for "MEASURING IMAGE CHARACTERISTICS OF OUTPUT FROM A DIGITAL PRINTER," issued Aug. 14, 2001, teaches a method for measuring image characteristics of printed output from a digital printer by sending test pattern data to the digital printer, generating a printed image of the test pattern data at the digital printer, scanning the printed image to obtain digital pattern data, and analyzing the digital pattern data of the printed image. The test pattern that is printed includes target objects designed to reveal specific printed image characteristics, and the analysis of the data from scanning the printed image includes the generation of one or more quantitative ratings with respect to printed image characteristics.

Image quality problems occurring in a document processing system are often identified by applying image processing and pattern recognition techniques to analyze specific test patterns. The results are analyzed in conjunction with known generic or unit specific machine data in a diagnostic expert system to assist in the determination of the cause of the problem. Further systems are provided to determine and execute a recommended service procedure such as, for instance, a user guided repair, scheduled maintenance service, parts replacement, and the like. Banding or similar image defect analysis can be accomplished using a series of computer modules and algorithms to analyze specific test patterns via techniques such as image processing and pattern recognition.

In order to accurately diagnose the machine, it may be necessary to print and analyze several different test targets on what have conventionally been several test patterns. As used herein, the term test target is generally used to represent a region of a larger test pattern, although it is possible to have a single test target encompass an entire page. Such test targets typically exist as static pre-defined test patterns (or pages) for a given machine or series of machines. Moreover, the test patterns employed for printing or output devices are generally stored in memory or are uploadable to the output device. After analysis of the output of a test pattern, several failure modes may remain as possible causes and different analyses may become necessary to further narrow down the failure mode. Hence, the printing and analysis process is often repeated several times until the failure mode is accurately determined. To completely diagnose a problem, it may be necessary to print multiple pages of pre-defined test patterns, although only small parts, or targets, of each test pattern are actually needed.

The present invention is directed to an improved system and method wherein the need to print entire test patterns, over several print-analysis iterations, is simplified and expedited. The present invention employs a dynamic test pattern composition process and system, wherein the test targets required for analysis are selected and printed on a test pattern rather than simply printing several patterns having desired test targets. The dynamic selection and printing of test targets enables better utilization of the test pattern and is more efficient in that it potentially reduces the number of printing-analysis cycles. At a minimum, the present invention reduces the time and effort to print the test patterns and to scan the printed samples into electronic form so that they can be further analyzed.

At any time, given the results from user-input and/or prior tests, the diagnostic system of an output device can calculate which sequence of test targets is most likely to be the Optimal Test Target Sequence (OTTS) for the continued diagnostics. Generation of the next test pattern is a constrained optimization problem wherein the optimization criteria is often to maximize the discriminating power between the failure modes of sets of targets or the information obtained from the set of test targets. Ideally, a single or limited number of test patterns can then be generated which contains test targets according to the determined optimal sequence. This is contrasted with conventional systems where, if the test patterns were pre-defined, one would have to choose among the existing test patterns at hand. In order to print the first few test targets from the OTTS, the system may have to print multiple pages of test patterns.

What is needed in this art is method to automatically compose test patterns that are optimized according to the Optimal Test Target Sequence (OTTS) at any given point during the diagnostic sequence to ensure that statistically the minimal number of pages will be printed in order to complete the automatic diagnosis.

In accordance with an aspect of the present invention, there is provided a method for dynamic test pattern generation, including the steps of: automatically selecting a set of test targets as a function of the probability of possible defects and machine performance data and to maximize an optimization criteria; and placing the set of test targets on a digital test pattern.

In accordance with another aspect of the present invention, there is provided a method for automated image quality based diagnostics and remediation of a document processing system, including the steps of: selecting, as a function of potential defects, at least one of a plurality of test targets for output as a test pattern by the document processing system; generating a printed output of the test pattern; obtaining data pertaining to the document processing system, including scanning the printed output to obtain image data pertaining to the output of the at least one selected test target; and analyzing the data to obtain an initial diagnosis, the diagnosis including at least one potential defect as identified in data corresponding to the at least one selected test target, and including performing an image quality analysis of the data corresponding to the data for the at least one selected test target.

In accordance with yet another aspect of the present invention, there is provided a system for automated image quality based diagnosis of a document processing system, comprising: a test selection module, including a dynamic test target selection function, so as to select at least one of a plurality of test targets as a function of a diagnostic request to produce a test pattern; a print engine, operatively associated with the document processing system, for rendering the test pattern; an image quality analysis module that identifies and characterizes defects within a test target on the test pattern produced by print engine and generates key features of the defects for further analysis; and a diagnostic engine that analyzes the data generated by the image quality analysis module to obtain a diagnosis, the diagnosis including at least one diagnosis from a list of potential defects in data corresponding to at least one test pattern image, wherein the diagnostic engine refines the initial diagnosis based on the at least one identified defect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The preferred embodiments of the invention will be described in detail, with reference to the following drawing in which:

FIG. 9 is an example of a table of image quality feature values for banding defects based on conditional probabilities of the features given the malfunctions;

FIG. 10 is an example of a table of machine data feature values for banding defects;

FIG. 11 shows an example of a table of machine data feature values for banding defects based on conditional probabilities of the features given the malfunctions;

FIG. 12 illustrates a sample algorithm for extraction of features from a given machine data set.

FIG. 13 shows a sample test selection table for banding defects;

FIG. 14 shows a sample failure Repair table;

FIG. 15 shows a sample Repair Action Table for a set of malfunctions;

FIG. 16 illustrates a sample algorithm for extraction of features from a given machine data set wherein the data set used is the output of the cleaner stress test and the banding test.

The present invention will be described in connection with a preferred embodiment, however, it will be understood that there is no intent to limit the invention to the embodiment(s) described. On the contrary, the intent is to cover all alternatives, modifications, and equivalents as may be included within the spirit and scope of the invention as defined by the appended claims.

DETAILED DESCRIPTION OF THE INVENTION

The following description begins with a discussion of document processing systems, in general, and defect analysis in order to characterize the general embodiment and context within which the present invention will be explained in detail.

As used in this application, document processing systems, include analog and digital copiers, printers, scanners, facsimiles, and multifunction machines, each of which includes an output device. Said systems include those based on all direct and indirect marking technologies, both color and black and white, such as xerography, ink jet, liquid ink, lithography, and the like.

Figure 1:
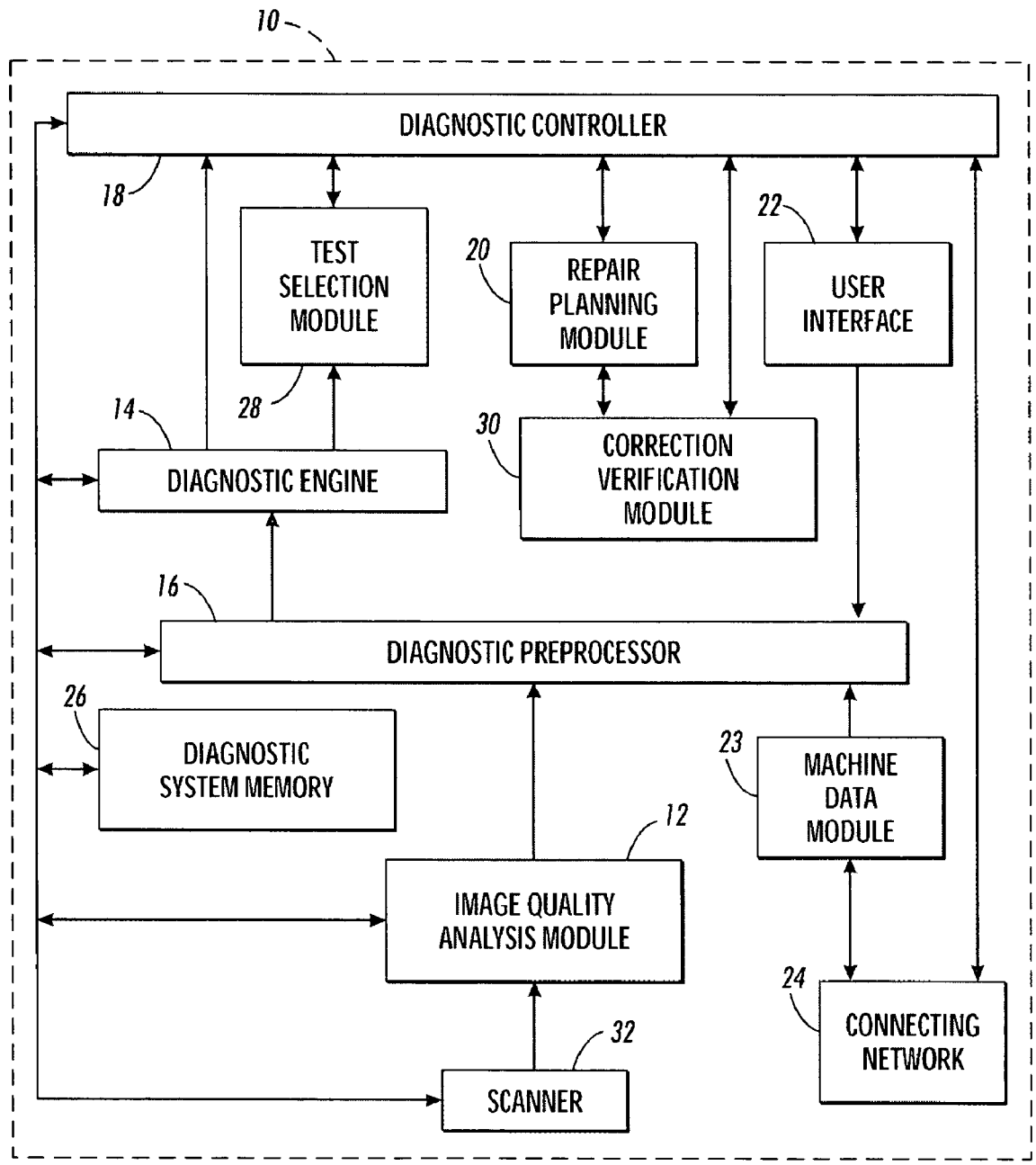
FIG. 1 is a block diagram illustrating an exemplary diagnostic system.

Reference is now being made to FIG. 1, which illustrates Diagnostic System 10 for analysis of defects often experienced in such systems as identified above and, as a consequence, are frequent causes of service calls. Analysis of lines, streaks, and bands is no easy task as such defects can reflect as many as thirty or more malfunctions occurring within the Document Processing System. Diagnostic System 10 operates in association with Document Processing System 34, shown in FIG. 2, and can be part of a document processor, multifunction machine, printer, etc. Alternatively, Diagnostic System 10 could be a computer connected to the machine, or could be implemented as a stand alone appliance having appropriate plug-in capability for operation with a variety of machines in many different environments.

Figure 5:
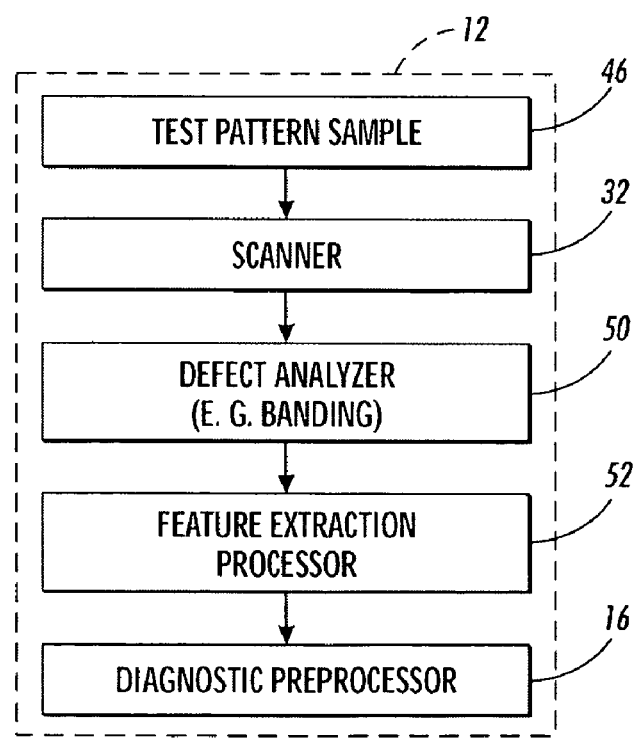
FIG. 5 is a block diagram of Image Quality Analysis Module of FIG. 1.

Image Quality Analysis Module 12, as further described with respect to FIG. 5, identifies and characterizes defects in terms of quantitative parameters and generates key features of the defects for further analysis. The Image Quality Analysis Module analyzes the image using image processing techniques known in the arts such as: Fourier transform analysis, band-pass filtering, histogramming, edge detection, 1-D projections, segmentation, classification, artifact detection, FIR filtering, wavelet analysis, statistical analysis, pattern recognition, or the like, to evaluate image quality and/or identify defects. The user may also be prompted to input additional features describing the defect such as, for example, selecting one of a set of descriptive icons or exemplary images, or answering specific questions. The output of the Image Quality Analysis Module and the user input data is adapted for use in Diagnostic Engine 14 by Preprocessor 16 wherein data is processed to correlate key features of the defects to one or more system malfunctions or failure modes as possible sources of the defects. A probability of causation is evaluated and a recommended repair or service selected by Repair Planning Module 20. The results are presented to the user through User Interface 22 which may include a display screen and keypad, not shown.

With continued reference to FIG. 1, Diagnostic Controller 18 coordinates with processing components to store algorithms and data used in analysis and diagnosis such that a database of errors can be maintained for future reference. At the end of a diagnostic cycle, discussed below, after an automated repair system or after the user has performed the appropriate repair action, Correction Verification Module 30 prompts to run additional tests or to have the system print additional test prints to determine if the corrective action taken was successful in eliminating the defect. If not, the user may be directed to take further action or to contact service personnel. It will however, be appreciated, that several iterations of the diagnostic process may be required before the causality is determined and/or a recommended repair is identified.

Test Selection Module 28 selects the appropriate testing, and the sequence of defect and other machine tests to be performed. The Diagnostic Engine performs the task of sifting multiple sources of information to isolate the cause of the malfunction indicated by the defect. It will be appreciated that the diagnosis can be an iterative process. For example, Test Selection Module 28 may, based on an initial diagnosis, indicate that additional test patterns are to be scanned or that certain specific image quality parameters should be emphasized for evaluation or that specific defect features should be extracted in order to further indicate the malfunction. Selected test targets and patterns are copied or printed and subsequently scanned in a predefined sequence. In addition, the Test Selection Module may select the specific region of the scanned image to be analyzed and the set of features that need to be extracted from the scanned data (e.g., a banding metric). The test and sequence may also be predetermined and stored as a look-up table (maps malfunctions to specific tests) or it can be determined dynamically during the diagnostic process based on optimizing criteria such as time needed to complete the test, maximizing the discriminating power of the tests, or maximizing the accuracy of diagnosis. In other words, the step of selecting at least one of the plurality of test patterns for output includes identifying, as a function of possible defects (either initial diagnosis or iterative diagnosis), at least one test pattern that will provide further visual indication of the defect, and causing the identified test pattern to be rendered as an output of the document processing system. When implemented as a simple lookup table, at any time during the iterative diagnostic process, the malfunction that appears most probable at that point may be chosen and a test associated with that malfunction chosen as the next test to perform. Where there is more than one test associated with a failure, the test will often be performed in the order in which they are listed in the table with the constraint that any test performed already will not be repeated.

Machine Data Module 23 receives data with respect to both current and historical operational experience with System 34. Such data may be obtained from Sensor Array 44 directly from Print Engine 36 and Document Feeder 38, from stored historical data, or from concurrently performed machine test procedures. Machine Data Module 23 may take on a variety of architectures depending on the means by which the data is collected. The output of Diagnostic Engine 14 is received by Repair Planning Module 20 for selection of the appropriate service procedure intended to correct the malfunction or failure mode identified.

Figure 2:
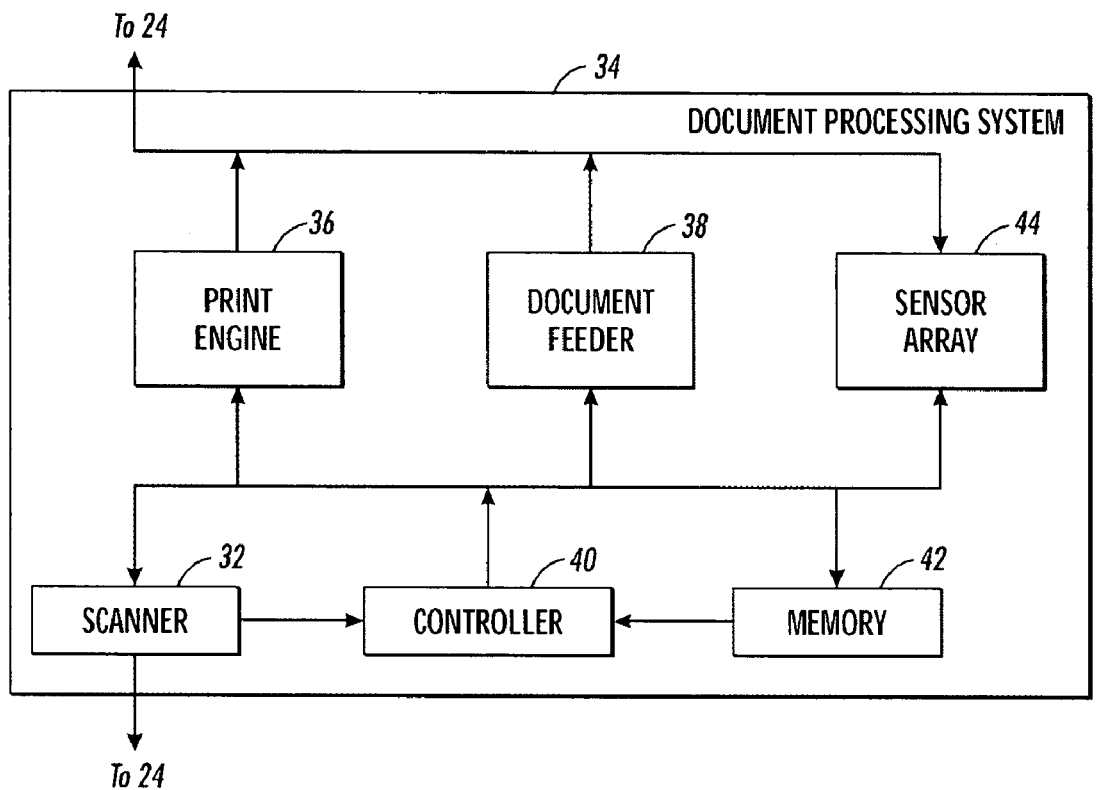
FIG. 2 is a block diagram of a document processor system adapted for use with Diagnostic System 10 of FIG. 1.

With reference to FIG. 2, Document Processing System 34 consists of Print Engine 36 served by Document Feeder 38 and Scanner 32. In some instances, such as a stand alone appliance or where there is no scanner available in the Document Processing System, a separate scanner can be used. Controller 40 provides operating control of System 34 operating in conjunction with Memory 42. Sensor Array 44 represents a plurality of sensor or sensing devices distributed throughout the system to monitor performance at key points or components and to generate current system data to assist in the analysis of defects and the determination of the failure mode. Additional data can be obtained by monitoring various signals and other characteristics of the system. Defect data is augmented with machine data obtained from the Sensor Array to provide improved diagnosis of malfunctions. Test Selection Module 28 may decide that additional data must be collected to refine the current list of probable malfunctions obtained by analysis of the image data.

The components of Document Processing System 34 are operationally interconnected by means of a system bus, not shown, connected to Diagnostic System 10 by Connecting Network 24. The components are shown for clarity as independent functional modules. However, it should be understood that related functions can be implemented by a Central Processor Unit (CPU) incorporating algorithms for initiating and controlling various functions to implement the features associated with the functional modules. In addition, it should be appreciated that any one of, or a portion of the components of the diagnostic system can be repositioned elsewhere, for instance, on a distributed network or on a remote diagnostic system. The flexibility of location could be implemented through the use of wired or wireless links or any other known or later developed elements capable of providing data to and from one or more of the functional modules. Furthermore, Connecting Network 24 can be any one of or combination of a system bus, a serial or parallel connection, a distributed or local area network such as an intranet, a metropolitan area network, a wide-area network, a satellite communication network, an infrared communication network, the Internet, or the like. Moreover, the Diagnostic System and the Document Processing System need not be connected by any electronic means in particular. Rather, information can be transferred therebetween through various data storage or printed copies or samples.

Figure 3:
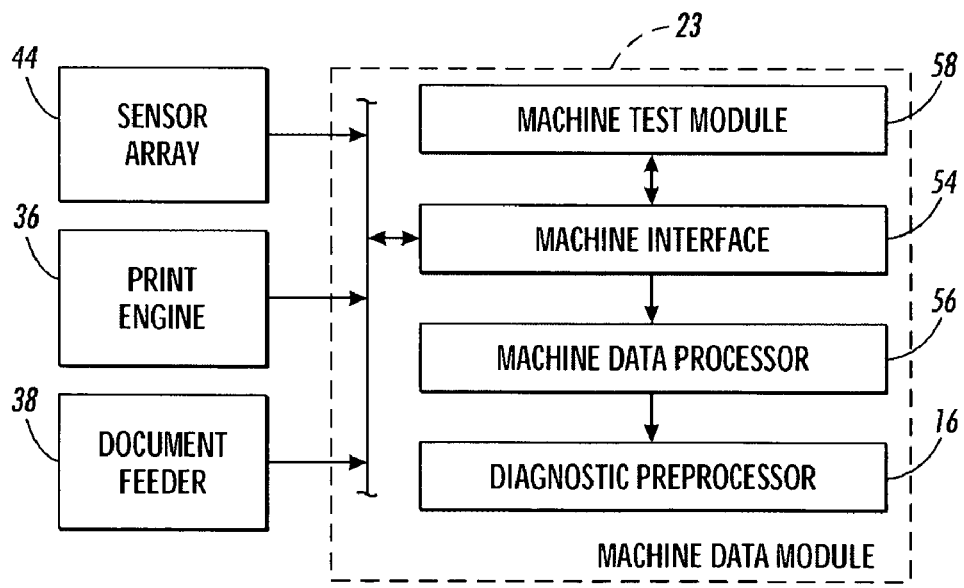
FIG. 3 is a block diagram of Machine Data Module of FIG. 1.

With reference to FIG. 3, the Machine Data Module 23 generally comprises Machine Interface 54, which is a computer element programmed to receive data such as historical data along with signals from Sensor Array 44 and raw signals indicative of various operational status and events from the print engine, document feed and other components of Document Processing System 34. In some instances, it may be desirable as a result of an initial analysis to run particular diagnostic tests to further isolate a suspected malfunction. This may be accomplished by Machine Test Module 58 through Machine Interface 54 and Controller 40 or directly through specific system components, and the results of the tests may be received through Sensor Array 44 or by way of Memory 42. While the Machine Test Module is shown to be part of Diagnostic System 10, in the alternative it may be part of Document Processing System 34. The data that is received from Interface 54 is processed in Machine Data Processor 56 and features of the machine data are extracted for transmittal to Preprocessor 16.

Machine data obtained from the document processor may include machine operational data such as set point(s), actuator, and sensor data collected during regular operation of the machine, machine usage data, historical data including output and fault counters and performance data. Such data may be obtained directly from Print Engine 36, Document Feeder 38, Sensor Array 44, or from Memory 42. A set of special diagnostic or performance tests may be run and the effects of the tests monitored by the Sensor Array. Examples of such tests are described in the following patents: U.S. Pat. Nos. 5,864,730; 5,893,008; 5,903,796; 5,937,224; 5,960,228; 5,946,521; 5,995,775; 6,016,204; 6,081,348; and U.S. Pat. No. 6,198,885, commonly owned and incorporated herein by reference in their entirety. This data can also be supplied to the Machine Data Module and may be factored into the analysis performed by Diagnostic Engine. The Machine Data Module is added to the diagnostic system for this purpose and provides the means to collect and deliver machine data to the Diagnostic Preprocessor 16 for consideration in the analysis performed by the Diagnostic Engine 14. Machine Data Processor 56 generates a set of high level features from the machine data based on analysis of the data. The generated features diagnostic are converted to a format acceptable to the particular diagnostic engine used. Example machine data features and their correlation to malfunctions is provided in FIG. 13. Example machine data features with conditional probabilities is provided in FIG. 14.

Figure 4:
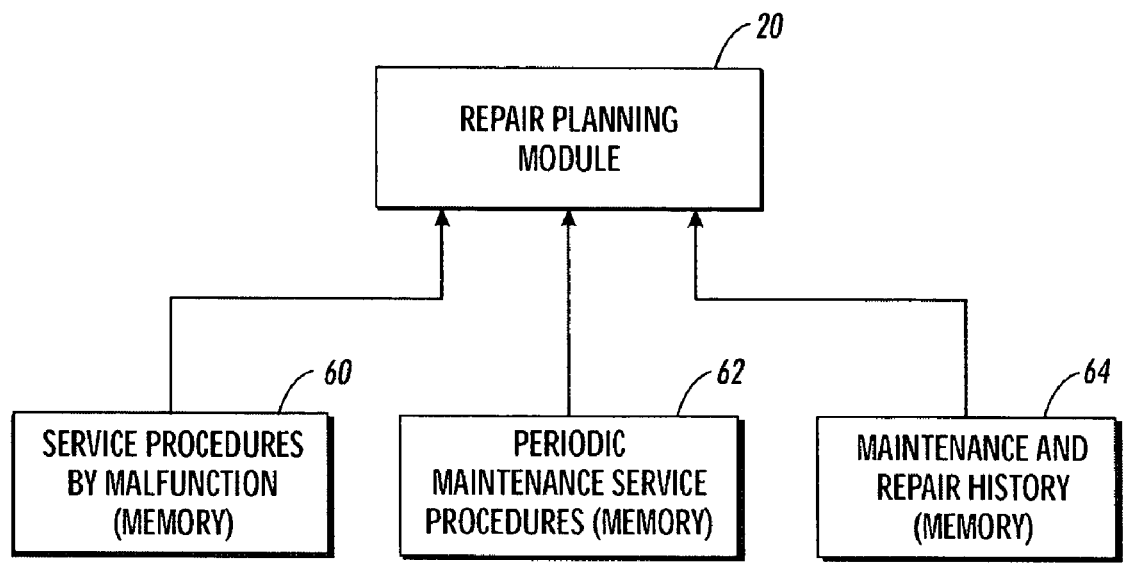
FIG. 4 is a block diagram of Repair Planning Module of FIG. 1.

With reference to FIG. 4, Repair Planning Module 20 generally comprises memory 60, which contains a table of service or repair procedures correlated with specific malfunctions presented for selection by Repair Planning Processor 48. It may be advantageous to review the scheduled or periodic maintenance service procedures stored in memory 62 for the purpose of accelerating service to fix the malfunction. In addition, memory module 64 provides access to a system's maintenance and repair history to allow the replacement of parts where warranted. Repair procedures may be performed by the customer, system administrator, operator, certified service personnel, or the like. An example repair action table for a set of malfunctions, such as employed in module 60, is provided in FIG. 15. A probability of causation of a malfunction based on the key features can be calculated with a significant degree of accuracy and used to identify a repair that is likely to correct the defect.

It should be noted that the above components of the diagnostic system are described as separate modules, which can be implemented independently or commonly by a wide variety of elements such as: a special purpose computer; a programmed microprocessor or micro-controller; a peripheral integrated circuit element such as an ASIC; a digital signal processor; a hard-wired electronic or logic circuit such as a discreet element circuit; a programmable logic device such as a PLD, PLA, FPGA, PAL; or other means for implementing these functions.

Referring now to FIG. 5, analysis often begins with a test pattern or a series of test patterns 46 designed to isolate defects. Such patterns are well known and may consist of a uniform gray or single-color image or a series of uniform image segments at varying gray levels. In conventional systems, the test patterns may further be hardcopy originals. In accordance with aspects of the present invention, the test patterns are comprised of test targets that are dynamically assembled as original digital images. The test patterns are submitted to the Document Processing System 34 and printed or output one or more times during test sequences to provide system feedback data under varying circumstances, for example, with or without document feeder, enlarged or reduced, repetitive copies, and other steps which tend to isolate possible root causes of the defect or failure mode. Alternately, or in addition, the digital test patterns may be submitted as print jobs and printed using Print Engine 36. Copies thereof or print samples obtained from the scanner or the print engine, respectively, may be scanned for diagnostic purposes using either an external scanner or Scanner 32. The digital image data generated by the scanner is used to identify the presence of defects in Defect Analyzer 50. The Defect Analyzer is a computer, or program operating on a computer, capable of conducting image analysis by processing image data to characterize defects or failure modes in terms of quantitative parameters.

The method described above assumes that a fixed set of test targets already exists, and that the Diagnostic System simply chooses among them when composing a test pattern to be printed. Further efficiency improvement may be realized by automatically generating the digital test targets on the fly, taking into account both the needs of the Diagnostic System and the constraints of the available space on the test pattern. For example, it may be preferable to "squeeze in" a smaller-than-normal uniform area test target, rather than not to print it at all on the current test pattern due to space constraints. Another example is where the current state of diagnosis points towards a defect that can best be diagnosed by printing a test target that has a specific area coverage (or color combination) that is not among the pre-defined set of test targets. In both of these situations, the (e.g., color(s), print density, target size, target placement position, orientation, etc.) or parameters of the test target are further adjusted to optimize the diagnostic capability of the test pattern in which they are selected for inclusion. Although the function of adjusting the test target parameters may be accomplished in one of several modules described above, the Test Selection module 28 is believed to be particularly suited for such a function.

After defect analysis is performed on a scanned image, further processing in Feature Extraction Processor 52 determines features of the defect based on predetermined characteristics. The extraction process is accomplished by executing a series of algorithms based on the defect analysis outputs. The basic steps of the analysis involve the comparison of the analysis outputs or quantities derived therefrom, to predetermined maximum or minimum thresholds and device specific parameters. Examples of device specific parameters for a banding-related defect or failure include the distance between fuser fingers, diameter of the donor roll, the photoreceptor pitch, etc.

Extracted features are converted to a format acceptable to the Diagnostic Preprocessor 16 and submitted to the Diagnostic Engine 14 for additional analysis. The Diagnostic Engine is capable of executing algorithms that apply qualitative reasoning, probabilistic reasoning, or fuzzy reasoning, and could be rule based, object based, model based, or case based. The output of the Diagnostic Engine is sent to Diagnostic Controller 18 for correlation with a repair scheme from Repair Planning Module 20 and presentation via User Interface 22, or via alternative means such as output on printed sheet, etc.

The process of analysis can be repeated through iterations designed to isolate the most probable malfunction or failure mode based on a refined set of key feature values. This iterative process can consider image data, machine data, or user input data. A predetermined value of certainty can be set for the purpose of comparison and screening of the probable malfunctions. The analysis is deemed successful upon the selection of a malfunction having a certainty above a preset threshold certainty level. Thereafter, a suitable service procedure is selected. If the analysis fails to achieve the threshold of certainty then a list of probable causes may be displayed with associated service recommendations. If no malfunction is perceived then the diagnostic service is aborted and the user is notified.

Figure 6:
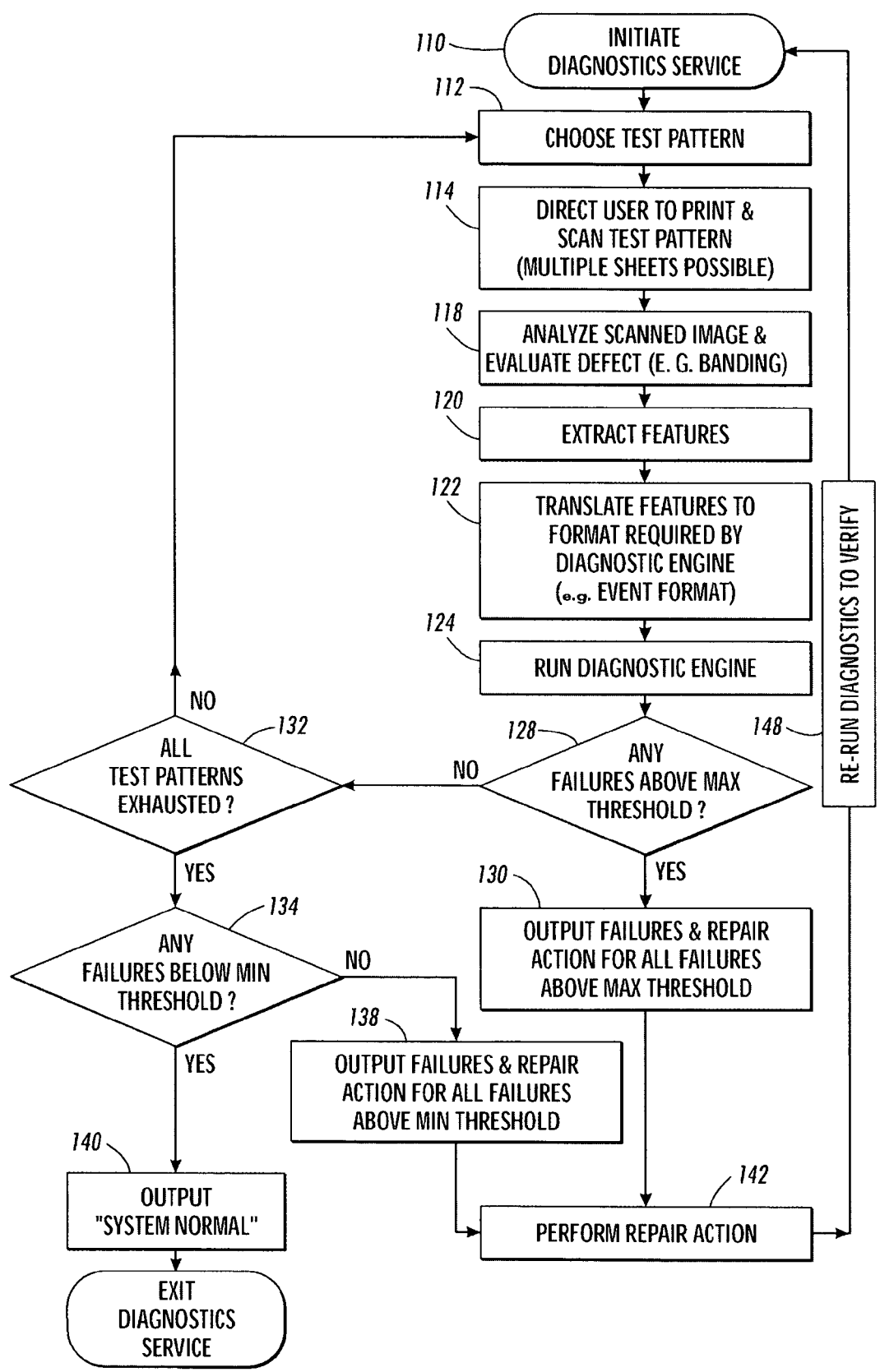
FIG. 6 is a flow diagram of the process of defect analysis without machine data.

With reference to the flowchart of FIG. 6, this process is started at step 110 by initiating the diagnostic service, either manually by the user after observation of defects on a document (e.g., banding), or automatically as the result of image monitoring or periodic service procedures carried out by the Document System 34. To first determine the presence of a defect, the user or system initiates the selection (step 112) and then output or printing (step 114) of a specially designed test pattern, followed by scanning the output (step 114). The resulting image data, generated by the scanning step 114, is analyzed at steps 118-124 to determine if there is a defect. This would be shown, for example, by certain elements of the defect analysis output exceeding threshold values or machine specifications, as tested at steps 128 and 134). If no defect is found, and all test patterns have been analyzed (step 132), then the diagnostic service terminates, step 140, and the user is notified to either exit or to contact service depending on whether the diagnostic system was invoked after the user observed a defect or not. Furthermore, step 118 may be accomplished by a system scanning in the test pattern printed and automatically processing the resultant data. Furthermore, step 118 may also be accomplished by a user answering specific questions that are designed to go with the test pattern, or the test target(s) to be precise, and to input or feed this user data to the diagnostic engine.

Based upon the detection of a failure above a threshold, as detected in step 128 (or alternatively, detection in step 134 and output in step 138), the system prompts a user or service persons to perform repair actions at step 142, for example as generated at step 130. Once performed, the system preferably re-runs the diagnostic process, or at least portions thereof, (step 148) to verify or assure that the repair action has had the intended result and that the defect, malfunction or failure mode has been correctly identified and resolved.

As illustrated by the flowchart of FIG. 6, the analysis cycles through a series of iterative steps potentially using a variety of test targets available in storage. In addition, the test targets can be run in different test patterns, or multiple targets in the same pattern, under alternative settings or using different components to isolate a malfunction. Instructions can be presented to the user through the user interface or the cycles can be accomplished automatically as instructed by the Diagnostic Controller. As described above, the diagnostic data can be supplemented by machine data, wherein machine data can be collected and analyzed sequentially prior to or after scanning and analysis of the defect image data.

In order to provide the Diagnostic Engine with data from which to correlate particular extracted features with a particular malfunction, which may cause the particular defect, a matrix of malfunctions is typically compiled with likely defects. For example, for a banding-type image defect, the following exemplary malfunctions may occur: Photo Receptor Scratch; Poor Photoreceptor Ground; Contaminated Charge Corotron; Damaged Cleaner Blade; Contaminated Exposure Slot (ROS); Damaged Donor Roll; Damaged Fuser Finger; and/or Contaminated CVT Glass.

Figure 7:
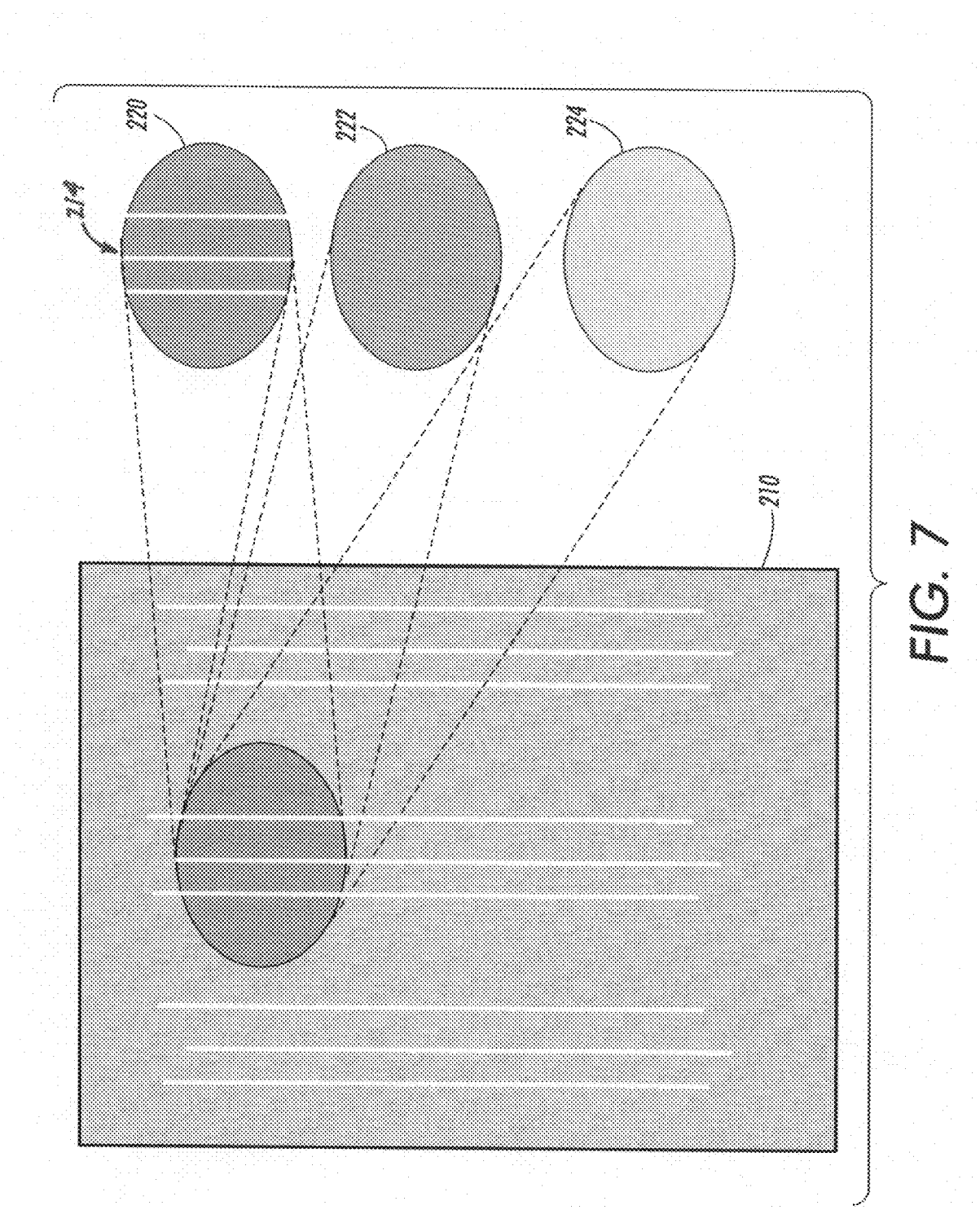
FIGS. 7 and 8 are illustrative examples of test patterns and test target regions thereon.

To isolate the cause of the resulting image defect, a test pattern having, for example, a uniform gray or three-color image at a certain area coverage is scanned using several variations of steps. An example of such a test pattern is illustrated in FIG. 7. On the left of FIG. 7 is a "gray" test pattern 210 printed using a CMY output of a predefined coverage (e.g., thirty percent). To the right of the test pattern are enlarged regions 220, 222 and 224, which illustrate the color separations for each of the primary colors. As will be described, the streaks or bands in test pattern 210 may be caused by the presence of bands within only one of the primary printing colors (e.g., cyan). Moreover, it may be difficult for an observer or a scanner to distinguish or determine which of the primary colors is causing the defect, unless it was able to detect bands 214 in separation 220. In accordance with the present invention, however, the test pattern is created according to an optimal test target sequence (OTTS), and the test targets may be dynamically selected (step 112, FIG. 6) to accomplish the desired detection in a single test pattern by using selected targets.

Figure 8:
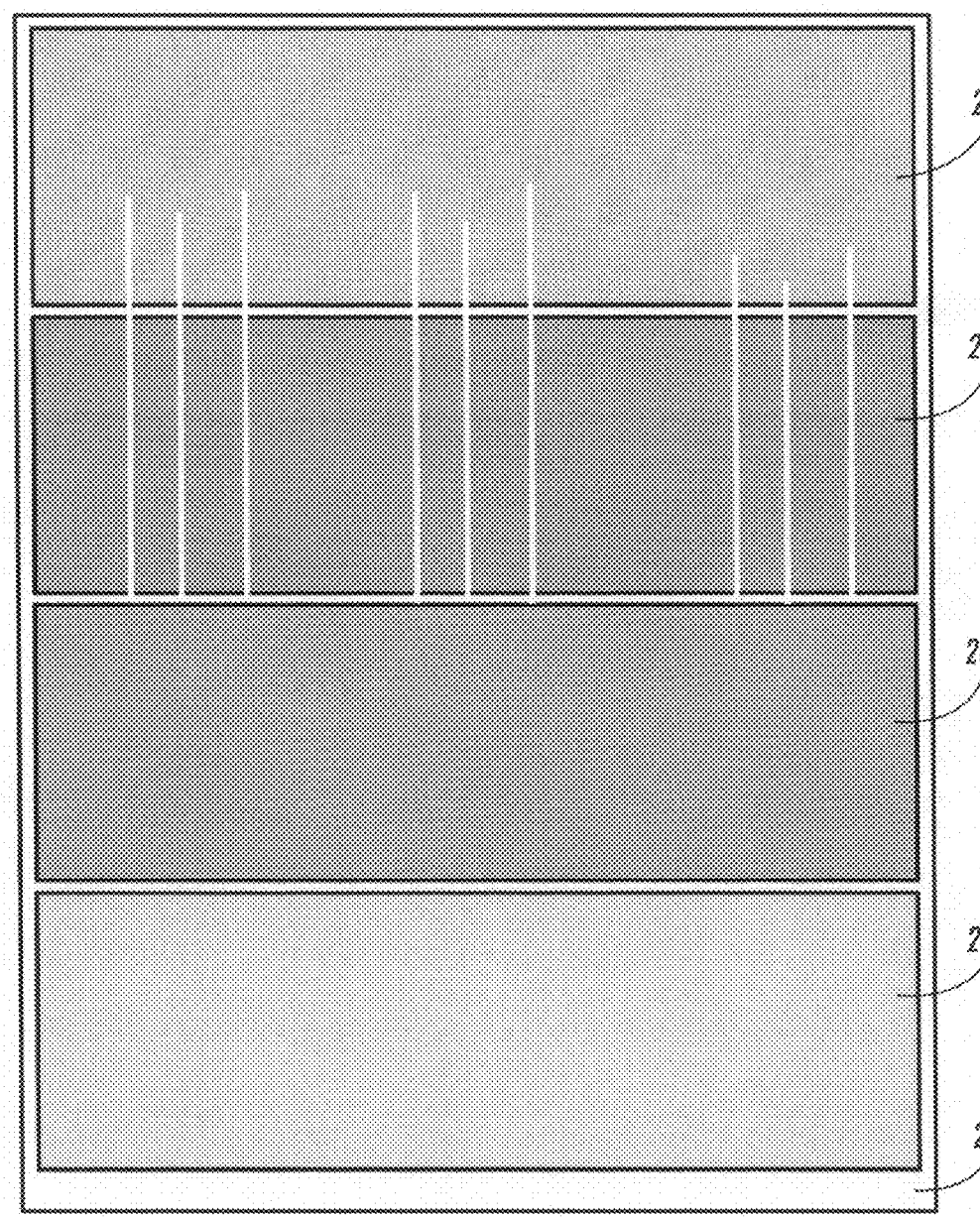

More specifically, if banding is identified in a preliminary test pattern, or is suggested by machine diagnostics or user input, a test pattern 250 such as that depicted in FIG. 8 may be dynamically created, where a first region 260, representing a 30% gray area coverage is printed using a three-color combination, and then three subsequent regions (262, 264, 266) are each printed using single-color separations at the same area coverage. A user or scanner can then observe whether the banding occurs across the gray (C,M,Y) region and one or more of the single color regions: cyan 262, magenta 264 and/or yellow 266. Based upon such observation, the scanner would detect non-uniformities in output across region 262 and be able to determine that the malfunction or defect is occurring in relation to the cyan printing process.

Since some defects can be caused by more than one malfunction, the test pattern may require sequential copies of selected test targets or the pattern may employ redundant targets at different position on the pattern in order to isolate a pattern of the defect. For instance, a damaged fuser finger may cause repetitive streaks separated by a specific distance, which correlates to the distance between the fuser fingers. If such a malfunction is one of the set of malfunctions that the system is designed to detect then separation between defects would be illustrated by test target designed to illustrate the defect (e.g., gray area coverage positioned at the spacing of the fuser fingers) and extracted as a key feature.

FIG. 9 shows an example matrix of defect data based on experience with a fleet of document processors or with a particular processor can be used by the Diagnostic Engine. When the Diagnostic Engine used is a probabilistic one, such as a Bayesian Engine, the table often includes conditional probabilities of the defect features given the malfunctions as well as prior probabilities of malfunctions. An example of such a matrix with probabilities is shown in FIGS. 10-11.

Based on the test pattern, the Document Processing System is directed to produce one or more print samples of an original test pattern stored either in its internal or external memory, or on a network drive in a distributed network environment. It will be appreciated that the memory may include conventional random access memory, read-only memory, as well as removable media and similar memory devices so long as such memory is able to store a test pattern or the characteristics of a test pattern. Hence, the test pattern may be characterized not only in an image-like representation, but also in a set of directions for production of the pattern, where the system may dynamically determine the specific characteristics of the described pattern (e.g., color, size, density). The print samples are then forwarded to a scanner 32 for digitizing.

FIG. 12 shows a sample test selection look-up table. Where the Test Selection Module is an optimization scheme, the set of text target(s) for the test(s) chosen will often be that particular test(s) among the set of tests which maximizes optimization criteria such as: maximizes the entropy function; provides the best discriminating information to isolate the malfunction; minimizes the time taken to reach a diagnosis; minimizes the overall cost of running the diagnostic system; or any combination thereof. Moreover, it is not required that the test target(s) chosen be selected in accordance with a strict or pre-defined probability ranking. In other words, optimal test target selection may combine on a single test pattern, one or more targets most likely to discriminate or isolate the malfunction.

Algorithms for extraction of the machine data features from the raw machine data are typically based on statistical analysis techniques, including, discriminant analysis, classifiers and regression analysis, and data mining techniques such as decision trees and the like. The parameters of these tests are predetermined by analysis of machine data corresponding to various malfunctions as well as data from a normal machine with no malfunctions. The machine data generated during any diagnostic procedure is analyzed using these predetermined parameters and the feature values are determined. FIG. 16 illustrates a sample algorithm for extraction of features from a given machine data set wherein the data set used is the output of the cleaner stress test and the banding test and the features extracted are "Cleaner test pass" and "Cleaner test fail".

Figure 17:
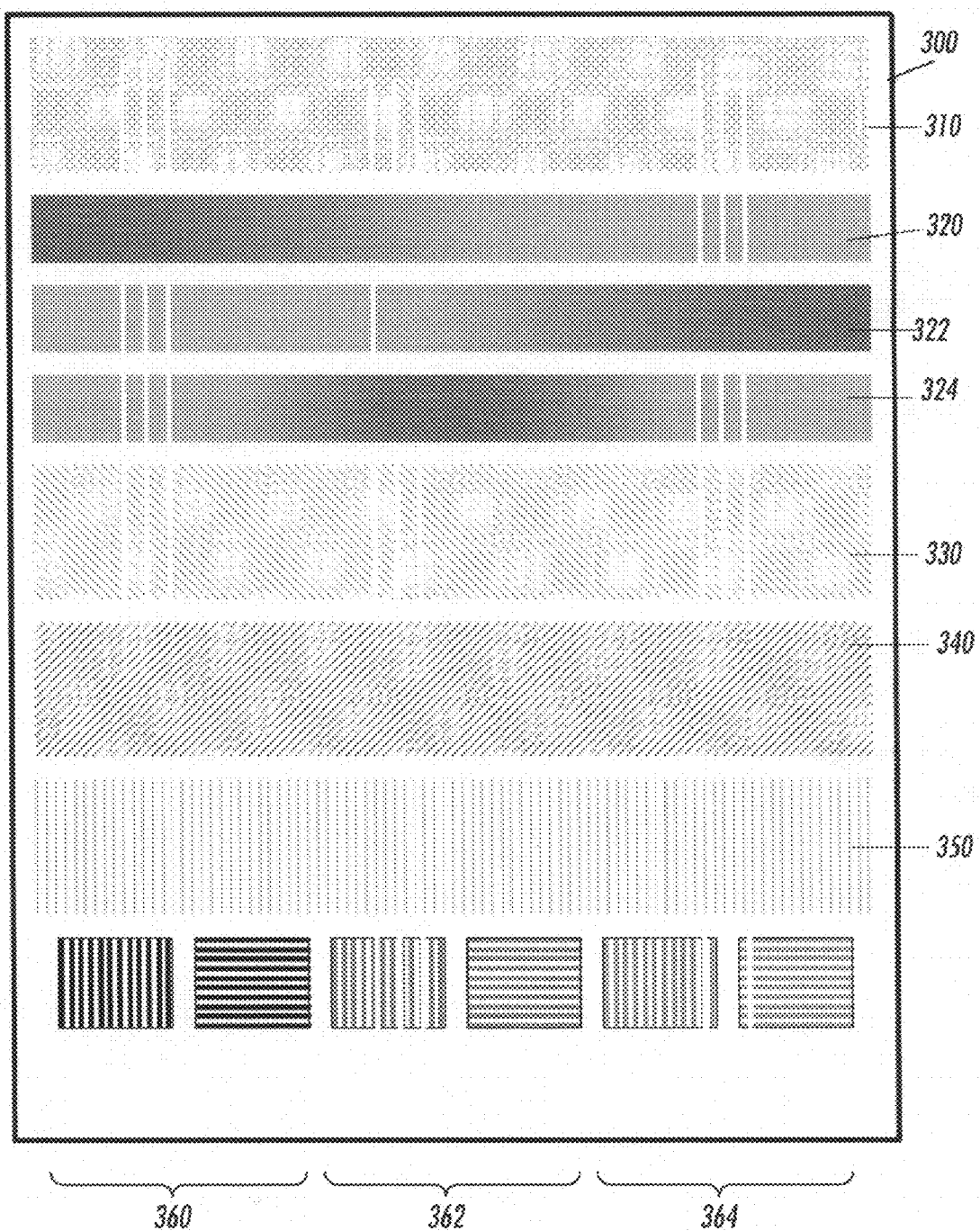
FIG. 17 is another example of a test pattern generated in accordance with further aspects of the present invention.

As noted above, one aspect of the present invention is directed to a system by which the Diagnostic System simply chooses among specific test targets that are available and dynamically creates a test pattern using such targets. Further efficiency improvement may be realized, however, by automatically generating the targets on the fly utilizing the advantage of digital test targets and parameters. As illustrated, for example, in FIG. 17, test pattern 250 of FIG. 8 might be easily modified to produce test pattern 300, which may include other test targets that would further increase the diagnosis probability. For example, test pattern 300 is now depicted to include not only the 30% gray and three color separations, but the parameter (e.g., height) of the targets (310, 330, 340 and 350) has been adjusted so that additional cyan gradient targets 320, 322 and 324 may be included so that the it may be determined whether the defects are a function of the gradient level. Similarly, a series of horizontal and vertical test targets 360, 362 and 364 have similarly been included at the bottom of the pattern; again allowing for additional information as to whether or not the defects are observable under alternative rendering conditions. It will be appreciated that the examples shown are for illustrative purposes only, and are not intended to specifically illustrate a particular defect, or the manner in which it is most efficiently identified. Rather, the examples in FIGS. 8 and 17 are intended to illustrate the adaptability of the present invention so as to enable the efficient selection of test targets and dynamic generation of test patterns so as to produce test patterns that may be rendered in support of an optimized diagnostic process.

In recapitulation, the present invention is directed to a method and system for optimal test target selection in conjunction with a dynamic test target selection and test pattern rendering operation. In an iterative process, a test pattern page(s) is composed comprising an optimal set of test targets, which can be accommodated within the size constraints of the test pattern. The method of the present invention makes use of algorithms known in the art, which are directed toward layout optimization, while ensuring that higher priority test targets, or targets that are preferably printed together, are accommodated on a single test pattern. For example, the step of automatically selecting a test target may include not only priority of targets, but also consideration of any requirement for combining the test targets on a common test pattern, and selecting a target and an additional related target, only when adequate space remains to print both. As another example, it may be preferable to "squeeze in" a smaller-than-normal uniform area pattern, rather than not to print it at all during the current test. Another example is where the current state of diagnosis points towards a defect that can best be diagnosed by printing a certain target page that has a specific area coverage (or color combination) that is not among the set of pre-defined test targets.

In such a manner, the present invention avoids the requirement to store, print and inspect several standard test patterns in order to diagnose a specific problem. It is believed that the present invention reduces memory needed for the storage of standard test patterns, improves diagnostic efficiency, reduces paper usage, and allows highly useful test targets, to be combined/used for diagnosis of a given problem.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for dynamic test pattern generation, for use with a document processing system, including:
automatically selecting a set of test targets, from memory in the document processing system, as a function of the probability of possible defects and machine performance data and to maximize an optimization criteria, wherein automatically selecting a text test target is a constrained optimization process and where the optimization criteria is to maximize the discriminating power between the defects detectable by the test targets; and
placing the set of test targets on a digital test pattern.

2. The method of claim 1, further including performing a test target layout optimization such that additional test targets within the set of test targets can be accommodated on a single test pattern.

3. The method of claim 1, wherein automatically selecting a set of test targets in accordance with an optimal test target sequence includes selecting a test target from memory.

4. The method of claim 3, wherein selecting a test target from memory is facilitated by a look-up table containing test target characteristics.

5. The method of claim 1, wherein automatically selecting a set of test targets includes consideration of any requirement for combining test targets within the set of test targets on a common test pattern, and selecting the test targets if adequate space is available to print the test targets.

6. The method of claim 1, wherein automatically selecting a set of test targets includes setting specific characteristics of at least one test target.

7. The method of claim 1, wherein the optimization criteria minimizes the time taken to reach a diagnosis.

8. The method of claim 1, wherein the optimization criteria minimizes the overall cost of running the diagnostic system.

9. The method of claim 1, wherein at least a portion of the machine performance data is obtained as a result of feedback from an analysis of a previously printed test pattern.

10. A method for dynamic test pattern generation, for use with a document processing system, including:

automatically selecting a set of test targets, from memory in the document processing system, as a function of the probability of possible defects and machine performance data and to maximize an optimization criteria; wherein automatically selecting a set of test targets further includes:

(a) automatically selecting a test target in accordance with an optimal test target sequence, wherein the sequence is a function of the probability of possible defects and machine performance data;

(b) placing the test target on a digital test pattern;

(c) automatically selecting a next test target in accordance with the optimal test target sequence, wherein the next test target is one that can be accommodated on remaining space of the test pattern;

(d) placing the next test target on the digital test pattern; and (e) repeating steps (c) and (d) until no additional test targets are accommodated on the test; and placing the set of test targets on a digital test pattern.

11. A method for automated image quality based diagnostics and remediation of a document processing system using a diagnostic system, including:

selecting, as a function of the probability of potential defects, at least one of a plurality of test targets for output as a test pattern by the document processing system, the plurality of test targets being stored in from memory in the diagnostic system;

generating a printed output of the test pattern;

obtaining data pertaining to the document processing system, including scanning the printed output to obtain image data pertaining to the output of the at least one selected test target; and analyzing the data to obtain an initial diagnosis, the diagnosis including at least one potential defect as identified in data corresponding to the at least one selected test target, and including performing an image quality analysis of the data corresponding to the data for the at least one selected test target.

12. The method of claim 11, further including refining the initial diagnosis by selecting, as a function of the initial diagnosis, another of the plurality of test targets for output by the document processing system;

generating a printed output of the selected test target;

obtaining data pertaining to the document processing system, including scanning the printed output to obtain image data pertaining to the output of the selected test target; and analyzing the data to obtain a refined diagnosis, the diagnosis including at least one potential defect as identified in data corresponding to the selected patterns.

13. The method of claim 11, wherein selecting at least one of the plurality of test targets for output further includes identifying, as a function of possible defects, at least one test target that will provide a visual indication of such a defect so as to cause the identified test target to be rendered as an output of the document processing system.

14. The method of claim 13, wherein the selection of test targets is further based upon the probability of a possible defect.

15. The method of claim 13, wherein specific characteristics of the test target are also determined as a function of the possible defects.

16. The method of claim 15, wherein the specific characteristics of the test target include at least the size of the test target and its location on the test pattern.

17. The method of claim 11, wherein selecting at least one of the plurality of test targets further includes identifying, as a function of possible defects, a plurality of test targets that will provide a visual indication of a plurality of defects so as to cause the identified test targets to be rendered on a common test pattern as an output of the document processing system.

18. A system for automated image quality based diagnosis of a document processing system, comprising:

a test selection module, including a dynamic test target selection function, to select at least one of a plurality of test targets as a function of a diagnostic request to produce a test pattern, wherein said test selection module operates automatically in response to machine data, wherein said data is indicative of the status of at least one subsystem of the document processing system as determined from a sensor associated therewith;

a print engine, operatively associated with the document processing system, for rendering the test pattern;

an image quality analysis module that identifies and characterizes defects within a test target on the test pattern produced by print engine and generates key features of the defects for further analysis; and a diagnostic engine that analyzes the data generated by the image quality analysis module to obtain a diagnosis, the diagnosis including at least one diagnosis from a list of potential defects in data corresponding to at least one test pattern image, wherein the diagnostic engine refines the initial diagnosis based on the at least one identified defect.

* * * * *